US008961103B1

(12) United States Patent
Wolff

(10) Patent No.: US 8,961,103 B1
(45) Date of Patent: Feb. 24, 2015

(54) VERTICAL AXIS WIND TURBINE WITH AXIAL FLOW ROTOR

(71) Applicant: John George Wolff, Stouffville (CA)

(72) Inventor: John George Wolff, Stouffville (CA)

( * ) Notice: Subject to any disclaimer, the term of this patent is extended or adjusted under 35 U.S.C. 154(b) by 0 days.

(21) Appl. No.: 14/315,007

(22) Filed: Jun. 25, 2014

(51) Int. Cl.
    *F03D 7/06* (2006.01)
    *F03D 7/00* (2006.01)
    *F03D 3/04* (2006.01)
    *F03D 3/00* (2006.01)

(52) U.S. Cl.
    CPC .............. *F03D 3/0409* (2013.01); *F03D 3/005* (2013.01); *Y10S 415/907* (2013.01); *Y10S 415/909* (2013.01)
    USPC .............. 415/4.2; 415/4.4; 415/907; 415/909

(58) Field of Classification Search
    USPC ............................. 415/4.1, 4.2, 4.4, 907, 909
    See application file for complete search history.

(56) References Cited

U.S. PATENT DOCUMENTS

| 1,519,447 | A | * | 12/1924 | Fortier-Beaulieu | ........... | 415/186 |
| 4,457,666 | A | * | 7/1984 | Selman, Jr. | ................... | 415/203 |
| 4,508,973 | A | | 4/1985 | Payne | | |
| 7,400,057 | B2 | | 7/2008 | Sureshan | | |
| 8,128,337 | B2 | | 3/2012 | Pezaris | | |

* cited by examiner

*Primary Examiner* — Edward Look
*Assistant Examiner* — Christopher J Hargitt

(57) ABSTRACT

An omni-directional vertical axis wind turbine includes an axial flow turbine rotor to supply force to operate an electrical generator mounted for rotation on a vertical shaft. A shroud surrounds the turbine rotor forming a circular chamber coaxially with the turbine rotor, enclosing the airflow entry face and leaving the discharge face uncovered. Wind entering the shroud from any direction flows inwardly through air passages, where a set of baffles surrounding the circular chamber redirect incoming airflow into a stream within the circular chamber. A cylindrical enclosure mounted concentrically with the turbine rotor within the circulation chamber houses an array of stationary vanes positioned to extend across the entry base and in close proximity to the turbine rotor and aligned at angles relative to the axis of rotation, form flow-through passages to intercept the airflow and redirect it vertically into the swept area of the turbine rotor in the form of laminar streams. Entrainment effect of the streams enhances the force of airflow through the sweet area, while leading edges of rotating turbine blades intercept airflow along continuously changing points of intersection from successive passages to create additional torque to power the turbine. Angular alignment and curvature of the stationary vanes can be varied to optimize performance over a variety of wind conditions.

6 Claims, 6 Drawing Sheets

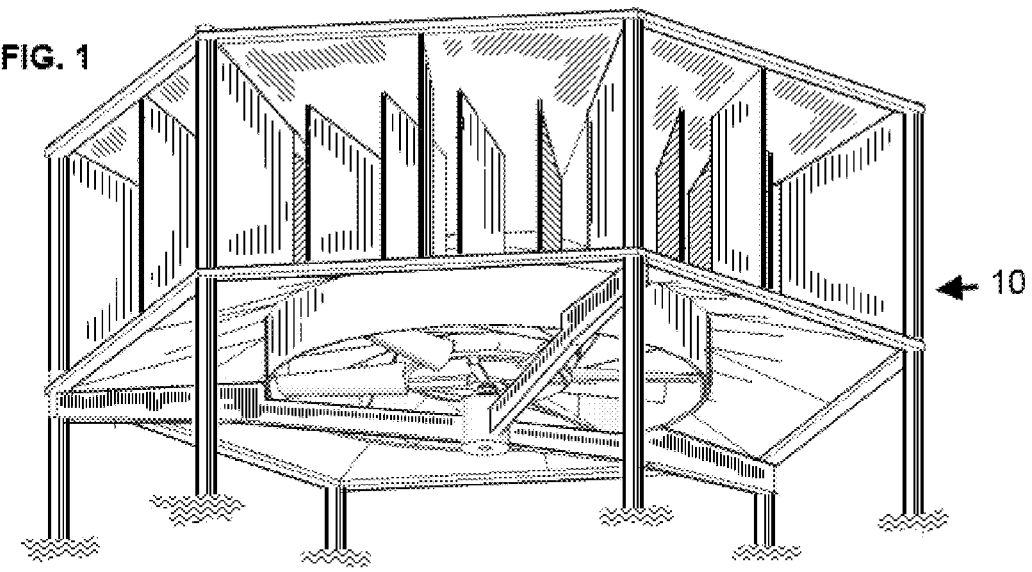
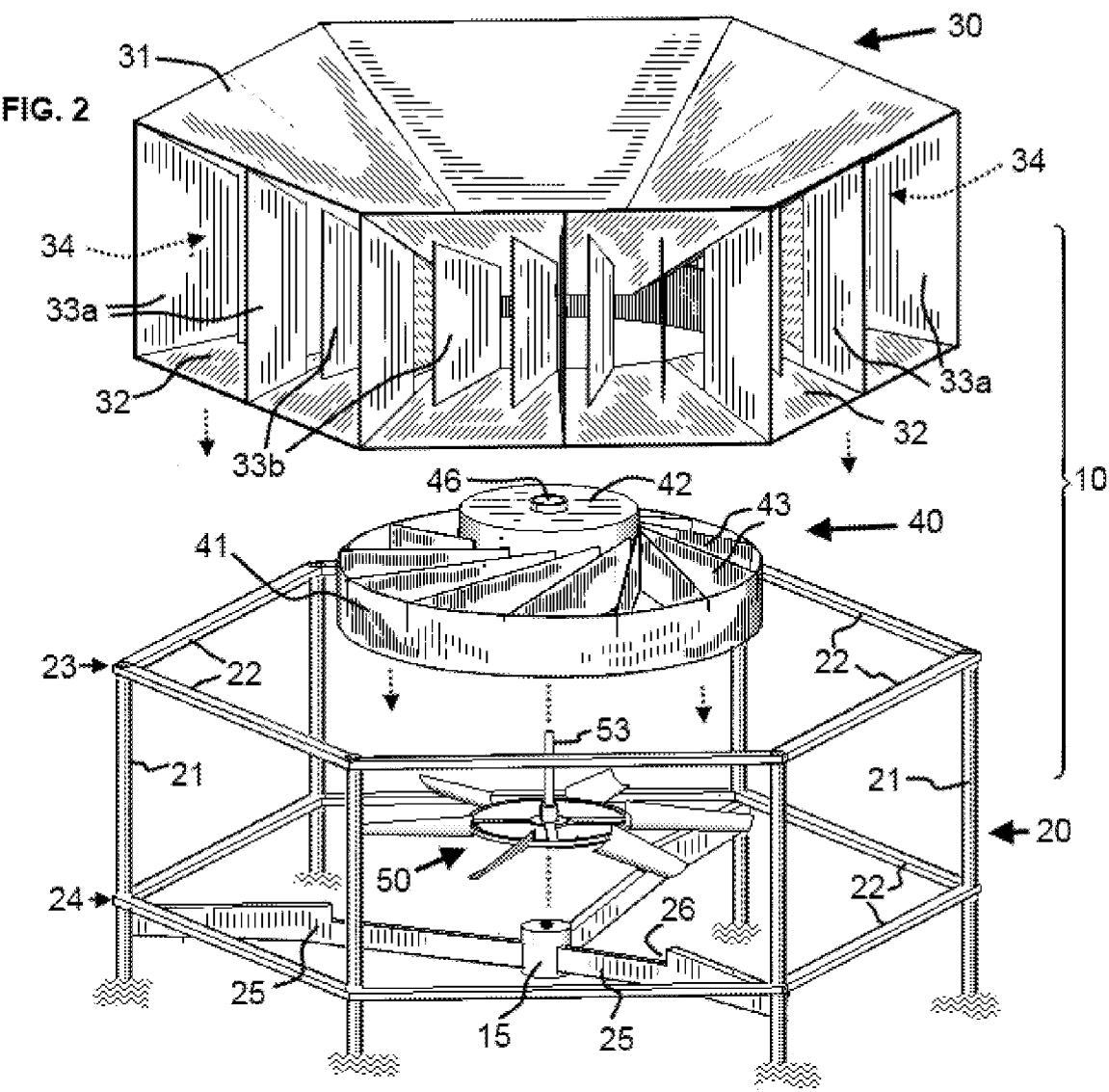

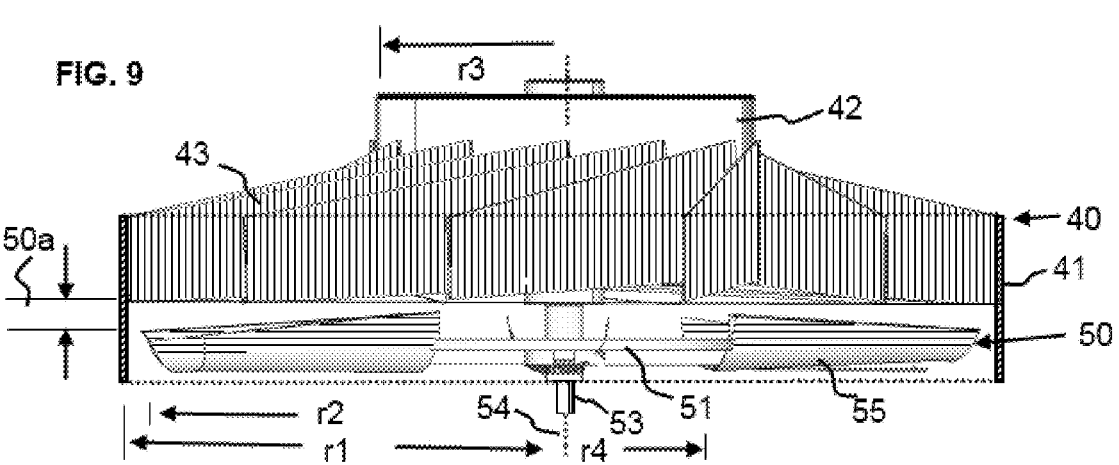
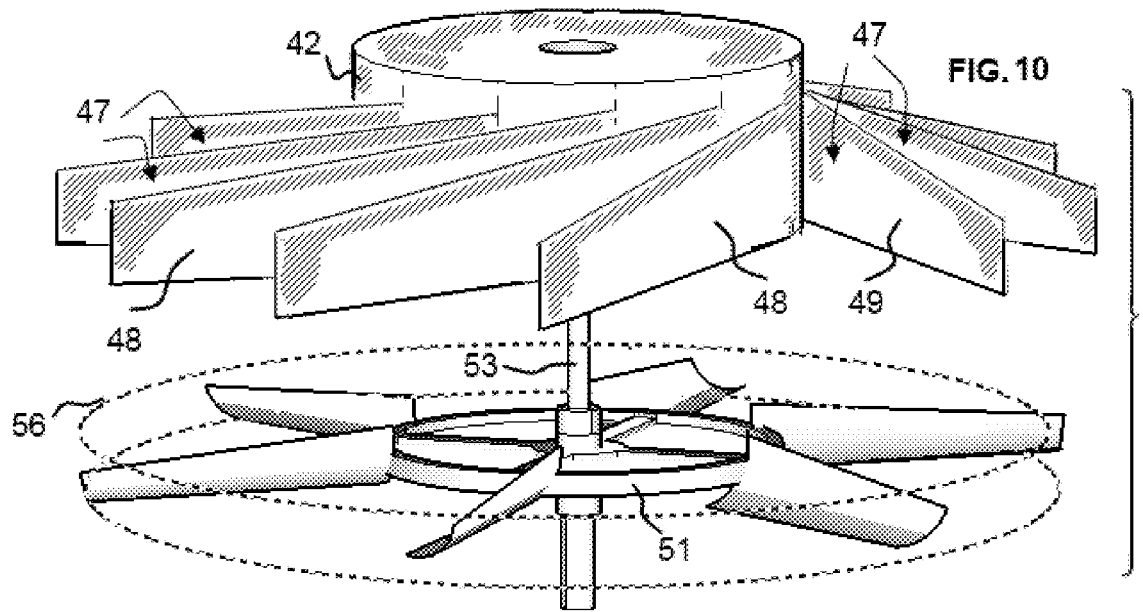

VERTICAL AXIS WIND TURBINE WITH AXIAL FLOW ROTOR

BACKGROUND OF THE INVENTION

With availability of fossil fuels in decline, wind power is gaining greater acceptance as a viable source of energy. Rapidly increasing cost of energy and shrinking supply of conventional carbon fuels increases the urgency to improve wind power technology.

Wind turbines are generally divided into two broad categories in terms of the orientation of the axis upon which the turbine blades rotate namely horizontal axis wind turbines (HAWT) and vertical axis wind turbines (VAWT). HAWT is by far the more commercially successful category, principally since its proponents tout its advantages of efficiency, scalability, and power output. Advances in materials technology enables construction of large turbines with rotor diameters exceeding 100 meters, and power output of 2500 kw or more. Arguably, technical superiority of this class of wind turbines is attributable largely to the use of large, highly efficient axial flow airfoil rotor blades, whereas VAWT have primarily employed cross-wind, or radial flow drag type rotor blades of various kinds, with their associated disadvantages.

Airfoil blades are designed to maximize the lift to drag coefficient for high speed rotation. In the HAWT class, blades are aligned to receive air flow full face on the plane of rotation. When wind blows into the face of these turbine blades in an axial direction, all blades are ideally exposed simultaneously to air flow through the swept area of the turbine blade structure on the entirety of each blade from the tip to the root. Power is drawn from the wind passing through the swept area of the turbine rotor over the leading edges of blades, creating negative pressure on the "lift" surface. The total amount of power that can be extracted is dependent on overall diameter of the blade structure, blade configuration, and wind velocity.

Airfoil blade technology is advanced and reliable. Yet despite their technical superiority, HAWT have fallen from grace among many people in recent times. Its detractors claim HAWT have serious drawbacks in that they pose great peril to many avian species due to the location along migration routes and large diameter of the swept area of the turbine blades. Located near residential areas, the turbines are attributed to cause health problems in humans due to low frequency sound waves emanating from the exposed blades. For these reasons they are viewed by many as environmentally and socially irresponsible approaches to application of wind power. Such turbines are prohibited from many populated areas, including large urban centers, where the need for electrical energy is greatest.

On the operational side, some researchers claim serious drawbacks in HAWT wind farms, where multiple turbines require large distance separation in order to avoid the "wake" effects of turbulence from adjacent turbines, thereby reducing wind energy availability. Consequently, vast areas are needed for situating HAWT wind farms, removing the land from other uses. Wind farms must be located in remote areas, requiring costly electrical grids to transport electrical capacity to populated areas.

Researchers have debated the applicability of the Betz efficiency calculation as a valid standard of comparison for all types of wind turbines. It has been proposed that a more equitable approach is to use calculations of relative power output over given time periods as measures of comparison. VAWT devices fare much better when such calculations are applied, in particular when comparing relative power output in wind farms of comparable size.

VAWT technology has unrealized potential worthy of exploration. Vertical axis wind turbines have the advantage of potentially avoiding the need for realigning the turbine rotor to face directly into the wind. While they vary greatly in technical detail, they have certain things in common. Crosswind, or radial flow turbine rotors receive air flow laterally in relation to the direction of rotation, and blades, or vanes rotate in opposition to wind flow during a portion of the rotation cycle. In order to improve performance, it is common to provide additional means or augmentations to counter the forces of wind flowing in opposition to blade rotation. Turbines such as those equipped with cupped blades or "scoops", where the vertical dimension of the scoop often exceeds the rotor diameter, are examples of radial flow turbines. They rely on a surplus of positive air pressure or "drag" within a cupped configuration of the "scoop" moving in the direction of the wind to overcome the negative force of wind flowing against the outwardly facing surface of the rotating "scoop" moving in the direction opposing the wind. Power output is determined in part by the overall size of each "scoop" for collecting air flow, and effectiveness of means to counteract opposing force on the windward side of blade rotation.

Some augmented VAWT designs rely on various structural means for redirecting airflow to avoid the inefficiencies of blades rotating openly against the wind direction. These may include devices variously termed as shrouds, cowlings, diffusers, stators or other means to redirect horizontal wind flow into vertical streams capable of acting upon the rotor blades.

For example, U.S. Pat. No. 7,189,050 discloses a crosswind turbine that includes a rotor with cupped drag type blades and vertically oriented airfoil stators for creating a low pressure area on the leading face of the rotor blade during a power stroke.

Such devices may use various means to cover portions of the structure where blades or paddles are moving in opposition to the wind direction. Part of the energy is thereby lost or unavailable for extraction by the turbine, which makes the cross-wind turbine a less efficient mechanism overall.

An attractive alternative to the disadvantages of radial flow or cross-wind VAWT machines is a type of VAWT using axial flow turbine blades similar to those used in HAWT, with the axis of rotation positioned vertically. This requires some means for redirecting horizontal wind flow vertically in order to propel the turbine rotor.

Various developments are disclosed in the prior art directed to VAWT devices employing axial flow turbine blades. A number of developments employ air intake openings which are shaped to define venturi passages for accelerating airflow. Common to such devices are fans, rotors and the like, driven directly or indirectly via redirection devices by means of air flowing from the discharge opening of the venturi passages entering axially into chambers housing the fan or rotor. Considerable attention is given to efficient design of the redirecting devices and means for concentrating airflow in an axial direction, and avoiding losses due to leakage and other inefficiencies.

U.S. Pat. No. 4,164,382 discloses a fixed axis turbine supported centrally of a fixed air guide defining a plurality of horizontal air passages disposed circumferentially of the turbine and each being adapted to receive an air stream therein coming from a limited range of wind directions and effect accelerated air flow toward the turbine.

Such efforts at times lead to intricate, costly designs requiring highly specialized tooling and fabrication techniques that present challenges to production for widespread distribution of the devices.

For example, in U.S. Pat. No. 7,400,057 an omni-directional, vertical discharge turbine has a shroud for capturing wind and directing it through a throat section where an aerofoil multibladed rotor is mounted. The intake of the shroud incorporates multiple horizontally curved blades of toroidal form varying up to nearly twice the size of the rotor diameter, stacked, staggered and secured in place by multiple aerodynamic vertical walls.

In the case of omni-directional devices in this class, a possible inefficiency comes from air circumventing the swept area of the turbine rotor and consequent loss of a portion of the available power to drive the fan. Proposed solutions include rotating the entire apparatus to face incoming wind.

Other possible solutions involve using movable blocking devices or gates to block air from leaking past inactive sectors, or multi-stage diverters or blocking devices for redirecting wind toward an axial flow type rotor.

U.S. Pat. No. 8,128,337 provides a two-stage, omni-directional vertical axis wind turbine in which wind exiting from a first radial flow turbine rotor passes through a diverter with radially aligned vanes to rotate an axial flow type fan. In the latter disclosure, ambient wind is redirected into vertical air flow through the swept area of the turbine blade structure more or less uniformly over the entirety of the rotor diameter.

Notably, the intent generally is to maximize pressure differential between the inbound and outbound bases of the swept area, and the airflows are generally concentrated within chambers enclosing the rotor and are uniformly distributed across the inbound bases of the swept area of the axial flow rotors.

Axial flow type rotors which rely on secondary airflow redirected via diverters or through venturi openings lose considerable portion of available power when the secondary airflow is dispersed over the swept area of the turbine rotor. Lacking in the prior art are means to translate generally horizontal wind flow into modulated air streams that impact airfoil blades selectively in close proximity and capable of effectively utilizing these modulated air streams to drive a vertically aligned axial flow rotor, in order to improve the utilization of airflow distributed across the swept area of the turbine blade structure.

It is required in the present invention that the turbine rotor be an axial flow rotor mounted for rotation about a vertical axis. None of the developments in the prior art disclose or contemplate augmented or modulated power extraction by means of stationary vanes aligned over the inbound face of the swept area of an axial-flow turbine rotor so as to focus high intensity air streams upon the leading edges of blades in a continuous progression to optimize energy extraction from ambient wind over a variety of wind conditions.

In assessing applicability of prior developments affecting the scope of the present disclosure, it is noted that the principal requirements for operability of the invention disclosed herein cannot be employed in, and therefore are not present in, horizontal axis wind turbines and vertical axis wind turbines utilizing cross-wind or radial flow rotors.

In the case of horizontal axis wind turbines, these devices are adapted to be positioned facing wind direction, such that airflow is delivered into the swept area axially. Augmentations such as shrouds surrounding the rotor can be used to concentrate airflow upwind or downwind so as to improve pressure differential. There are no known means by which the present invention may be used to augment power extraction in horizontal axis wind turbines wherein the rotor is positioned facing wind direction. Positioning the rotor so as to receive airflow laterally would defeat the intent of the horizontal axis wind turbine and produce results of questionable value. In the case of wind turbines with radial flow rotors, and in particular vertical axis wind turbines with radial flow rotors, such devices are known to use stators or vanes to redirect wind into the rotor, however, their structure and operation are substantially distinct from the present invention.

It is known that force exerted laterally on an axially rotatable object delivers torque proportional to the length of the lever arm multiplied by magnitude of the force. By extension, a force applied on a turbine blade near the tip delivers greater torque over a narrower arc than an equal force exerted closer to the blade root. Using these concepts, it is possible to modulate or manipulate airflow distribution across the swept area of the turbine blade structure to optimize energy extraction.

The present invention proposes focusing a portion of an intensified air stream upon the leading edge of an axial flow type airfoil blade for the duration of its movement through an arc, such that the combined forces impinging on the blade deliver available force selectively, and thereby more effectively than if the entire air stream is distributed uniformly across the swept area of the turbine blade structure. No attempt is made in the prior art mentioned above to utilize this concept in a manner disclosed herein to optimize power extraction from axial flow turbine rotors over a variety of wind conditions.

The present invention is intended to provide an effective approach for augmenting the power extracted from a vertically mounted axial flow rotor.

It is a primary objective of the present invention to provide a more cost-effective means for generating electrical energy in a variety of wind conditions, utilizing the herein disclosed improvements in vertical axis, axial flow turbines.

Another objective is to provide a wind turbine design suited for installation in urban settings, such as building rooftops, utilizing the herein disclosed improvements in vertical axis axial flow turbines.

Another objective is to provide a scalable wind turbine design suited for use by public utilities, communities, corporations, and individual homeowners.

Another objective is to provide a relatively low-cost, simple design using readily available materials and thereby reducing some of the barriers to acceptance and wide-spread adoption of vertical axis wind turbines.

SUMMARY OF THE INVENTION

The present invention comprises in summary a vertical axis wind turbine with an axial flow turbine rotor in which at least three rotor blades are mounted on a rotor shaft for rotation about a vertical axis. The blades may be conventional airfoil blades such as are used in horizontal axis wind turbines. In operation the axial flow rotor describes a swept area with circular top entry base and bottom discharge base. A "collector assembly" or ducted shroud surrounds and envelops the turbine rotor enclosing a circular chamber formed coaxially with the swept area of the turbine rotor. The discharge base remains open. Wind from any direction is directed inwardly through air passages, where a set of baffles forming a "gated barrier" redirect incoming airflow into a swirling stream flowing radially within the circular chamber.

A "stator assembly" mounted over the entry base of the turbine rotor swept area intercepts portions of the swirling airstream and redirects the air flow vertically as boundary layers of high intensity laminar flow along the stator surfaces. Stationary vanes extend at angles relative to the axis of rotation, intersecting the turbine blade leading edges during the rotational cycle, beginning at the blade tip and progressing to the root. The trailing edge of each vane is positioned in optimal proximity to the leading edges of turbine blades, such that the turbine blades may rotate freely without contact with the vanes yet close enough to receive high velocity air flow selectively in a predetermined manner so as to optimize power extraction over a variety of wind conditions. Vanes may be curved to extend the period of intersection in a predetermined manner.

The foregoing and additional features will become apparent from the following description, in which like numerals refer to like components. Numbered references in the drawings with arrow pointers refer to assemblies of components, or component features. Arrow pointers lacking numbered references denote components in exploded illustrations.

It will be understood that all designations of direction and relative position, such as 'above', 'below', 'upper', 'lower', 'upward', 'downward', refer to the specified drawings by way of example solely, and not to the turbine assembly in general, since it is implicit within the disclosure, and is explicitly described therein, that the turbine assembly of the present disclosure may be positioned having the discharge face pointing up or down.

BRIEF DESCRIPTION OF THE DRAWINGS

FIG. 1 is a side elevational view in perspective of the turbine assembly of this invention, viewed from below.

FIG. 2 is an exploded view in perspective illustrating the main component members of the turbine assembly of FIG. 1, viewed from above.

FIG. 9 is a side elevational view of the turbine rotor and stator assembly of this invention, illustrating vertical positioning, with stator housing illustrated in cross-section, for greater clarity.

FIG. 10 is an exploded view in perspective illustrating the turbine rotor and stator assembly, less housing, of this invention.

DETAILED DESCRIPTION

Figure 3:
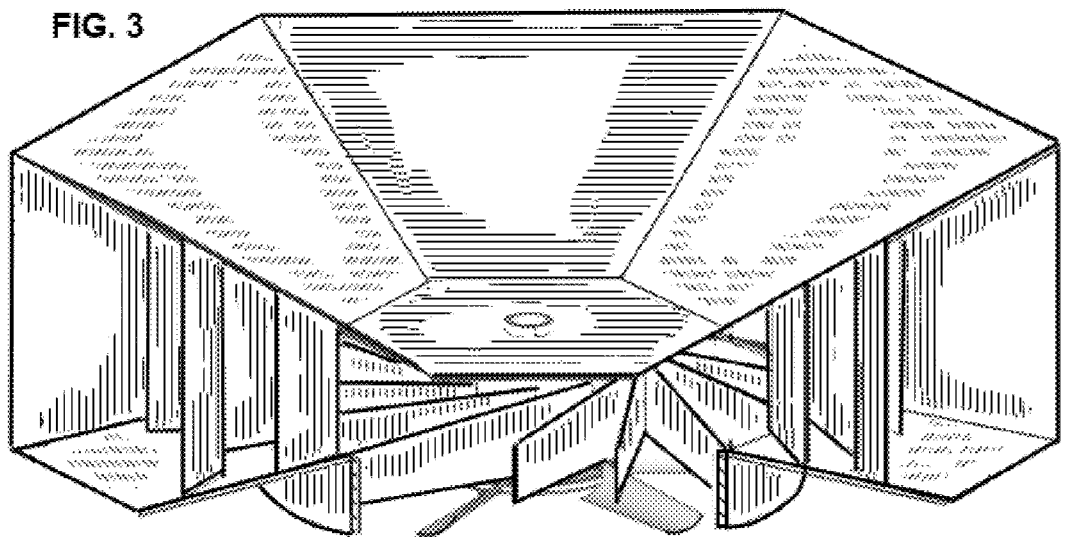
FIG. 3 is a cross-sectional view in perspective of the turbine assembly of this invention, along lines B-B of FIG. 8, viewed from above.
Figure 4:
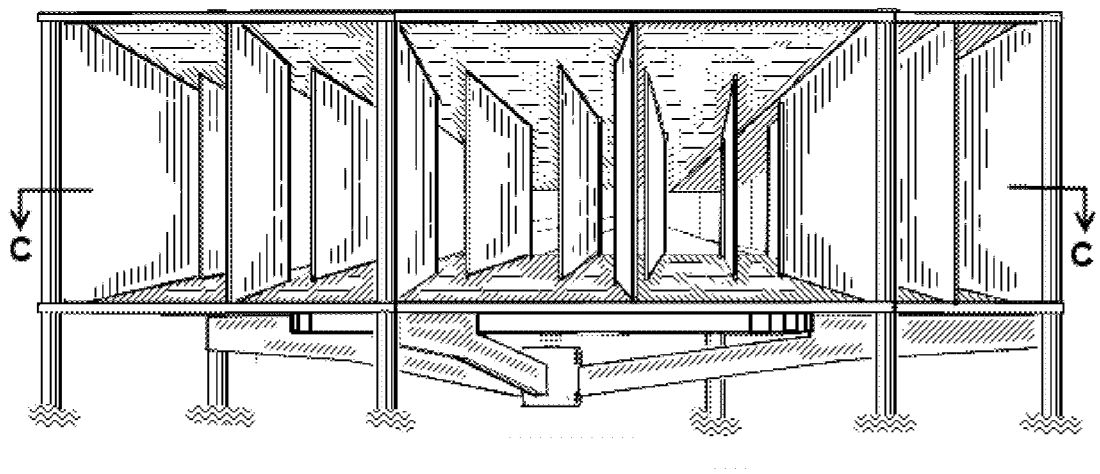
FIG. 4 is a side elevational view of the turbine assembly of FIG. 1.

In the drawings, FIG. 1 through FIG. 5 illustrate an embodiment 10 of the vertical axis turbine of this invention, in which air flows through the turbine rotor in a downwardly direction and is expelled at the base.

FIG. 2 illustrates embodiment 10 in an exploded view for greater clarity. The vertical axis turbine is mounted within a tower structure 20 for placement on or above a surface such as a field or building rooftop. A collector assembly 30 intercepts and captures wind flowing across the outer facade of the turbine. A stator assembly 40 redirects the incoming wind flow vertically, and an axial flow turbine rotor 50 intercepts the vertical airflow to rotate the rotor.

Tower Structure

Vertical frame members 21, which may be steel posts or other suitable structural components, are interconnected by means of horizontally aligned struts 22, to form a rigid tower structure 20 to be anchored on some surface, for supporting the turbine assembly. The vertical frame members 21 may be suitably sized in height for supporting the vertical axis turbine at a predetermined elevation.

As will be understood by those skilled in the art, tower structures of varying dimensions and heights may require additional reinforcing members, such as diagonal struts, depending on local weather conditions and elevation.

Upper and lower horizontal frame assemblies 23, 24, formed from horizontal struts 22 interconnected with the vertical frame members 21, support the collector assembly 30 along its outer periphery.

As illustrated in FIG. 2, support rails 25, connected to and extending radially inward from the vertical Frame members 21, at or near the lower horizontal frame assemblies 24 are joined centrally to an axial bearing member 15 to provide a rigid support platform for mounting the turbine rotor 50 and stator assembly 40. Notches 26 formed in the support rails 25 serve to stabilize the stator assembly 40 in precise coaxial alignment with the axial bearing member 15.

Collector Assembly

FIGS. 1, 2, 3 and 4 showing embodiment 10 illustrate several views of a preferred form of a collector assembly 30 for intercepting and capturing generally horizontal airflow from atmospheric ambient wind from any direction and redirecting the airflow into the interior toward the stator assembly 40. In the present embodiment 10, the collector assembly 30 displays a suitably formed shroud configuration of hexagonal form surrounding the turbine rotor 50 defining 12 individual covered inlet openings 34 for admitting ambient wind. However, the configuration of the collector assembly 30, and the number of inlet openings 34 may vary depending upon design considerations.

Figure 14:
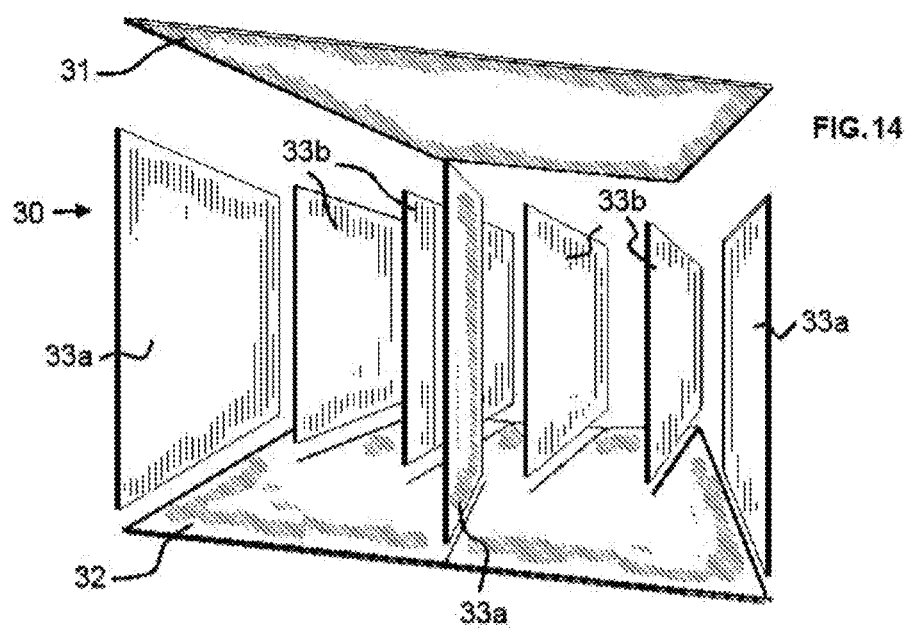
FIG. 14 is an exploded view in perspective illustrating component members of the collector assembly of embodiment 10 of this invention.

FIG. 14 shows an exploded view of component members of collector assembly 30 to illustrate a simple, inexpensive construction of flat panel members 31, 32, 33*a* and 33*b* in disassembled form. It will be understood that flat panel members are preferred, due to their simplicity and low cost; however, panel members may be provided with curved configurations in order to improve effectiveness of flow-through of moving air currents. As illustrated in FIG. 14, the collector assembly 30 is comprised of upper generally horizontally oriented panel members 31, lower generally horizontally oriented panel members 32, and vertically oriented panel members 33*a* and 33*b*, assembled to form a shroud comprised of inwardly converging ducts or passages with outwardly facing inlet openings 34 to surround the stator assembly 40. Two sets of vertical panel members 33*a* and 33*b* are distinguished by their positioning and orientation. A first set of vertical panel members 33*a* are positioned at the outer perimeter of the collector assembly 30 and are aligned radially, defining inlet passages 35, adapted to admit ambient wind radially toward the axis from any direction.

A second set of vertical panel members 33*b* are positioned within the interior of the collector assembly 30 surrounding the periphery of the stator assembly 40 and aligned at angles offset from the radial in order to form an exit section 36. A horizontal center buffer panel 37 joining panel members 31 covers the upper face of the turbine rotor to provide an enclosed air passage or circulation chamber 38 surrounding the axis of rotation, above the stator assembly 40, to redirect incoming airflow to flow in a circular stream distributed around the axis, limiting leakage of airflow from inactive inlet openings.

In the present embodiment 10, upper, lower, and vertical panel members 31, 32, 33*a* and 33*b* may be interconnected by means of clamps, brackets, couplings or other suitable means (not shown) and configured to define outwardly oriented entry openings 34 preferably sized to maximize the capacity of the collection area for capturing wind flowing into the collector assembly 30. Panel members 31, 32, 33*a* converge inwardly to form narrowing ducted inlet passages 35, along a generally inwardly oriented path, radially aligned to the axis of rotation, terminating in an exit section 36. Panel members 33*b* within exit section 36 form ducted outlets terminating at the perimeter of the stator assembly 40, encircling the circulation chamber 38. Panel members 33*b* are aligned at angles of between 30 and 60 degrees from the radial direction, forming a "gated barrier" or directional passages so as to redirect wind emerging from exit section 36 to flow unidirectionally over the stator vanes 43 in order to create circulating airflow within the circulation chamber 38 above the stator assembly 40. Alternatively, panel members 33*b* may be formed with a curvature and positioned so as to redirect wind emerging from exit section 36 to flow at angles of between 30 and 60 degrees from the radial direction. Horizontal center buffer panel 37 serves to interconnect the upper panel members 31 and thereby enclose the circulation chamber 38 and the entry to the stator assembly 40 in order to form a closed path for airflow into the stator assembly 40 preventing leakage or backsplash, and confining this incoming airflow within the stator assembly 40 in order to maximize power extraction from available wind. In addition, horizontal center buffer panel 37 serves to join together the individual collector panel members 31 around the center axis to form a strong, integrated structure.

Panel members 31, 32, 33*a*, 33*b* may be constructed from readily available materials such as flat steel or aluminum sheeting, plywood panels, and assembled with bolts, ties, interlocking edges, or other suitable assembly means. Alternatively, the collector assembly panel members 31, 32, 33*a*, 33*b* may be constructed from suitable textile fabric such as employed in tents, awnings and the like, stretched over rigid steel skeletal frames reinforced with steel rods. Clamps, ties or other assembly means known to those skilled in the art can be applied in assembling components. Simplicity and low cost of manufacture and replacement, ease of shipping and assembly, are primary reasons for these preferred configurations.

Upper and lower panel members 31, 32 are held in position by their distal edges on upper and lower horizontal frame members 23, 24 of the tower structure 20, respectively by suitable attachment means, such as clamps or ties.

Stator Assembly

In FIG. 2, the stator assembly 40 is shown in perspective, comprising a cylindrical outer enclosure 41, a stator hub member 42 and a plurality of stationary vanes 43 mounted within the annular open space between the outer enclosure 41, and hub member 42. The components are attached so as to form a rigid structure which is mounted on the tower structure 20 as described herein.

Figure 11A:
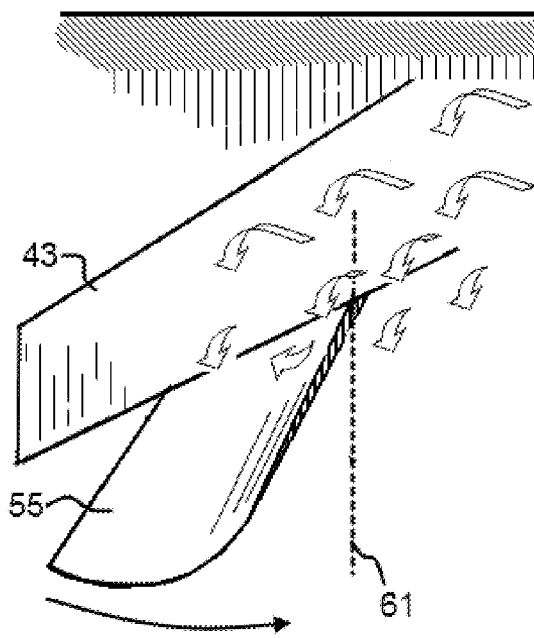
FIG. 11A is a pictorial illustration in perspective of a turbine blade and stationary vane in accordance with this invention illustrating the airflow pattern along the line of intersection.

As illustrated in FIG. 9, the stator assembly 40 comprises a plurality of stationary vanes 43 which are mounted in proximity to the entry face of the turbine blades 55, leaving a gap 50*a* of predetermined magnitude thereby permitting the turbine blades to turn freely. The stationary vanes 43 are aligned at angles from the radial such that during rotation leading edges of the turbine blades cross or intersect stationary vanes 43 over a time interval during the course of rotating through an arc A3 of predetermined radius as illustrated in FIG. 11D.

The cylindrical stator enclosure 41 and hub member 42 are mounted coaxially with the turbine rotor 50, supporting the stationary vanes 43 which are mounted. The stator vanes 43 are mounted in the interior annular space between the stator enclosure 41 and stator hub member 42, and positioned extending outwardly from stator hub 42 and attached at their distal ends to the stator enclosure 41. The vanes 43 are rigid panel members with generally vertically oriented sidewalls and extend horizontally between the stator enclosure 41 and stator hub member 42 at a preferred angle A1 in the range of 10 to 45 degrees from the radial direction. Alternatively, curved vanes 43*a* may be employed, as illustrated in FIG. 11D, in order to prolong the period of intersection, and modify the angle and period of intersection when rotating.

The stator enclosure 41 has a radius r1 greater than radius r2 of the turbine rotor 50 so as to enclose the turbine rotor 50 in order to shield it from ambient wind from below. Stator hub 42 has a radius r3 preferably in a range of between 10% and 50% of radius r1 forming an interior vertical wall for attaching the stator vanes 43 at their inner ends. The stator vanes 43 are spaced uniformly about the stator hub 42, defining wedge-shaped flow-through channels 47 between the vertical outwardly oriented face 48, and vertical inwardly oriented face 49.

Figure 5:
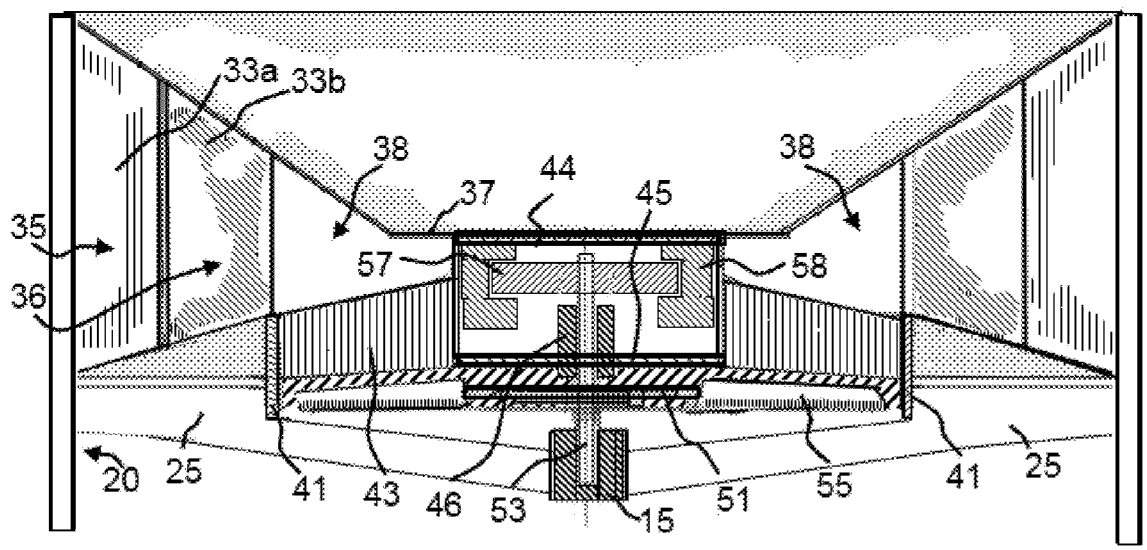
FIG. 5 is a cross-sectional schematic side view of the turbine assembly of FIG. 1, along lines A-A of FIG. 8, illustrating components.
Figure 6:
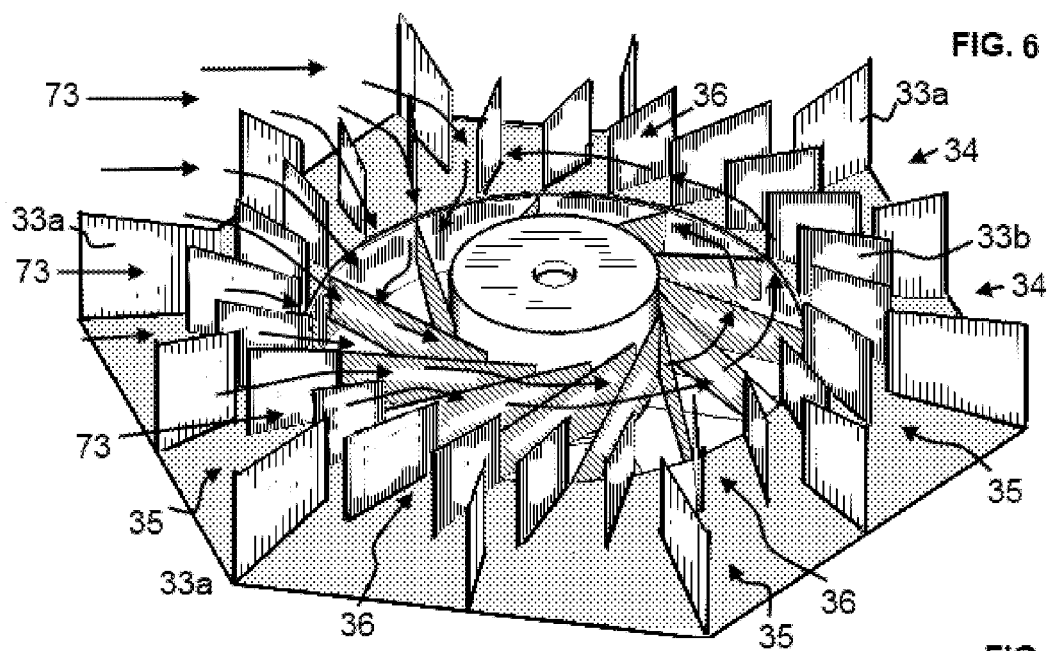
FIG. 6 is a cross-sectional top view in perspective of the turbine assembly of this invention, tower not shown, along lines C-C of FIG. 4, illustrating collector assembly configuration and airflow pattern.

As shown in FIG. 5 the stator assembly 40 is mounted in the tower structure 20 on support rails 25, in coaxial alignment with the turbine rotor 50, and, as best illustrated in FIG. 9, positioned so as to allow a minimal vertical spatial gap 50A of predetermined magnitude between the stator assembly 40 and the turbine rotor 50 in order to extract maximum force from airflow impacting the turbine rotor 50, while avoiding contact between the components during operation. Additional fittings or spacers (not shown) may be provided for adjustment of the minimal gap 50*a*, to suit local wind conditions, or to provide means to readjust alignment in the event of malfunctions.

An axial bearing member 46 within stator hub 42 is centered in alignment with the turbine rotor 50 for rotatably supporting the rotor shaft 53 at its upper end. A lower stator hub cover 45 secures axial bearing member 46 in position.

Additional reinforcing struts (not shown) may be provided, if required, connecting axial bearing member 46 and hub member 42 to the stator enclosure 41.

The stator vanes 43 may be formed from suitable materials such as steel or aluminum sheeting, reinforced plastic panelling, or molded reinforced fiberglass. The stator hub 42 is preferably a closed cylindrical enclosure which may be employed for housing electrical generating means mechanically connected to the rotor shaft 53. This may, for example, take the form of a directly driven magnet disk 57 and wire-wound coils 58 located in the stator hub illustrated by way of example in FIG. 5. Alternatively, an electrical generator may be directly driven by, or coupled with the rotor shaft 53 by means of a gear train, and located in the stator hub, or elsewhere on the tower structure 20. The rotor shaft 53 may extend upwardly or downwardly beyond axial bearing member 15 or axial bearing member 46 in order to be connected to an electrical generator located outside the stator hub.

Turbine Rotor

The axial flow turbine rotor 50 comprises a rotor hub 51 mounted on a rotor shaft 53 rotatable about a generally vertical axis 54 and rotor blades 55 extending radially outward from rotor hub 51 to define a circular swept area 56, oriented along a generally horizontal plane, as graphically illustrated in FIG. 10 for greater clarity. Optionally, an airfoil bladed axial flow rotor such as used in many conventional horizontal axis wind turbines may be employed. In the present embodiment 10 rotor hub 51 and rotor blades 55 are of unique design as described below.

In FIG. 2, the rotor shaft 53 is rotatably supported in a vertical position at its lower end within axial bearing member 15 At its upper end the rotor shaft 53 is held in an upright position by a second axial bearing member 46 located within the stator hub 42. In a cross-sectional schematic side view shown in FIG. 5, the rotor shaft 53 is connected to electrical power generating means located within the stator hub 42.

In this example, wire-wound coils 58 surround a permanent magnet disk 57 mounted on the rotor shaft 53. Torque imparted on the rotor shaft 53 by movement of the rotor blades 55 rotates the magnet disk 57 to create an electrical current in the wire-wound coils 58. The details of electrical power generating means are well known and need not be elaborated herein. Suitable power generating means may be selected for application in specific instances.

Rotor hub 51 is mounted generally midway on the rotor shaft 53 in order to provide means for rotatably mounting the rotor shaft 53 above and below the rotor hub 51 for greater stability. In the present embodiment 10 rotor hub 51 has a radius r4 approximating the radius r3 of the stator hub 42. This is an optional configuration which reduces the span of the blades to that required to cover the exposed portion of the swept area 56. Rotor hub 51 may be formed from suitable materials such as die-cast or machined aluminum, and provided with peripheral openings or other suitable means for attaching the rotor blades 55.

In the present embodiment 10 six rotor blades 55 are fitted to the rotor hub 51 by way of example. The actual number of individual blades may range from between 3 and 12 according to design and structural considerations such as blade construction, materials used, overall size and cost, performance effectiveness, as well as location of the turbine, and prevailing wind conditions.

Figure 11B:
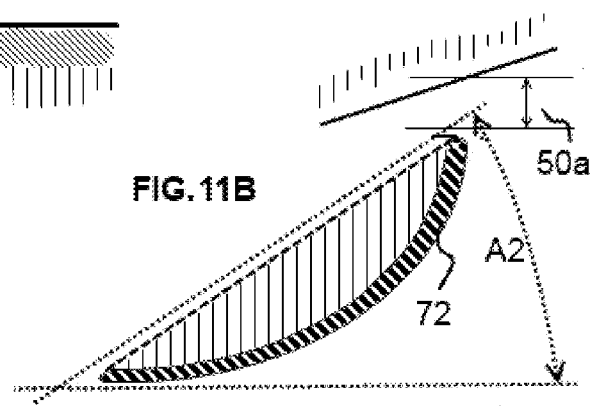
FIG. 11B is a cross-sectional schematic illustration generally of angle of attack of a turbine blade in accordance with this invention.

The rotor blades 55 are fitted to the rotor hub 51 to provide an optimal angle of attack A2 as illustrated in FIG. 11B, which may vary from blade tip to blade root for producing maximum torque at low to moderate wind speed. In keeping with the intent of the present disclosure, the rotor blades 55 illustrated herein are rudimentary in design and construction, providing a shallow curvature with inwardly cupped drag surface on the face exposed to airflow, outwardly formed lift surface 72 on the opposite face and optimally inclined leading edge defining the angle of attack A2. In basic versions of the vertical axis turbine 10 of this invention, in order to simplify construction and minimize cost, such cupped rotor blades 55 may be formed from flat panel components, such as aluminum sheeting cut and shaped in the appropriate configuration. Such construction is best suited to small, domestic turbines, and is not suitable for use in turbines with rotor diameter exceeding 3 feet. Alternatively, the rotor blades 55 may be molded from resin reinforced with fiberglass or Kevlar for durability and weight reduction. Rigidity of the blades depends on such factors as tensile strength of the material, overall size, thickness, and form.

Consideration must be given to the overall structural integrity of the blades, in particular to the need for fabrication techniques for overcoming blade flutter, flapping, twisting or warping during normal operation, in order to avoid premature failure of the turbine. Inward curvature of the upper drag face of the blades may vary depending on core thickness and rigidity. Preferably, curvature will fall within a range of 15 to 35 degrees radially when single membrane materials without a reinforcing core are used. Minimal or no inner curvature will be required when a reinforcing core is added.

Depending on size, cost, strength requirements and other performance factors, the rotor blades 55 may be of form and construction such as is employed in conventional axial flow turbine blades. Means to vary angle of attack of the blades in accordance with velocity of rotation may be included in order to improve operational efficiency of the turbine. In turbines with rotor diameter exceeding three feet, located in high wind areas wherein blades with tip speed can exceed wind speed, blades having conventional airfoil configuration are preferred, for optimum performance.

Figure 13:
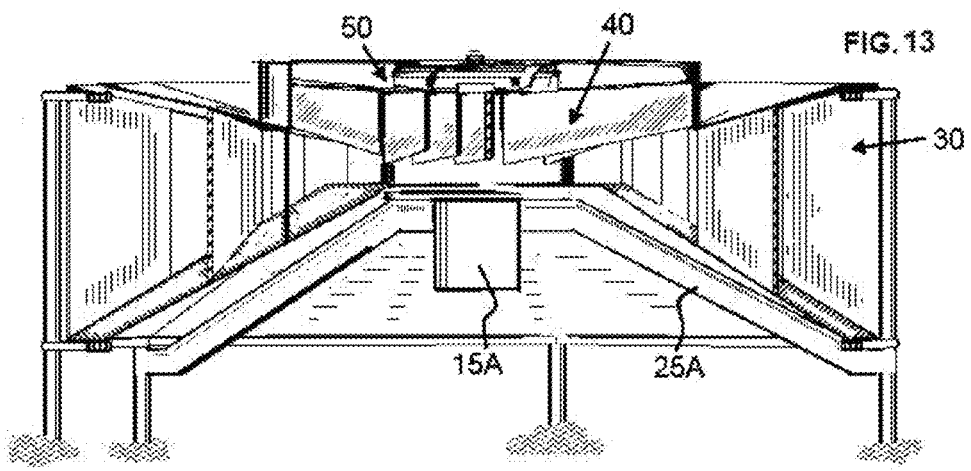
FIG. 13 is a cross-sectional side elevational view of the turbine assembly of FIG. 13 along lines A-A of FIG. 8, wherein the turbine rotor is inverted and lies above the stator vanes.

FIG. 13 and FIG. 14 illustrate an alternate embodiment 11 of the vertical axis turbine of this invention, which differs from embodiment 10 only in that components are inverted such that air flows through the turbine rotor in an upwardly direction and is expelled from the top. The vertical orientation of the axial flow turbine rotor 50A, stator assembly 40A, and collector assembly 30A are generally identical to, but inverted from corresponding components in embodiment 10. Notable structural differences require support rails 25A to extend upwardly to join axial bearing member 15A, which mounts the rotor shaft for rotation below the stator hub member. Some alterations in the tower structure may be required to securely mount the latter configuration.

In embodiment 11 the collector assembly 30A intercepts and captures wind flow blowing across the outer sides of the turbine, the stator assembly 40A redirects the incoming wind flow upwardly, and an axial flow turbine rotor 50A intercepts the upward airflow to rotate the rotor.

Operation

The operation of the turbine may be described with reference to FIGS. 6, 7, 8, 9, 10, 11A, 11B, 11C, and 110 which illustrate various operational features schematically.

In reference to FIG. 6, 7, 8 and FIG. 10, ambient wind, illustrated by directional arrows 73, flowing in the direction of the turbine is intercepted or "captured" by the collector passages 35 positioned facing wind direction. Airflow is directed inwardly by the first set of vertical panel members 33a, and is redirected into a swirling stream on the inlet side of the turbine rotor by the second set of vertical panel members 33b. The second vertical panel members 33b are positioned at angles relative to the radial direction and are spaced apart so as to form a "gated barrier" to redirect radial airflow at angles through the spaces between adjacent vertical panel members 33b, into the annular circulation space 38. Once inside the annular circulation space 38, the airflow is constrained therein, being continually redirected against the inwardly oriented walls of successive vertical panel members 33b, thereby creating a swirling stream within the annular circulation space 38. The swirling airflow is intercepted by the stationary vanes 43 of the stator assembly 40 and is redirected into the flow-through channels 47 of the stator assembly 40 in the form of high intensity laminar streams along the surfaces of the vanes 43.

This resultant vertical airflow streams through the circular swept area 56 in FIG. 10, from the entry base and over the rotor blades 55, and exits through the discharge base delivering a force which produces torque to rotate the turbine rotor 50. There are two components in the downward air flow which contribute to the resultant torque. The first component is the total mass of directional airflow delivered into and through the entire circular swept area 56 which impacts the drag surfaces as well as the leading edges of the turbine blades that are exposed to the airflow. The second component is the laminar airstream exiting the flow-through channels 47 at the trailing edges 43a of the stator vanes 43 as boundary layer airflow departs from the stator vane 43 and impacts a section of rotor blades 55 at and near intersections illustrated as a vertical line of intersection 59 of the stator vanes 43 and rotor blades 55. This second component delivers a torque that fluctuates or modulates in accordance with continual change in intersection 59. Depending on spacing of stator vanes 43, the number of vanes employed, and their positioning, each rotor blade 55 will simultaneously intersect multiple vanes 43 and be subjected to multiple high intensity streams continuously during rotation thereby producing fluctuating pulses of torque in order to augment turbine performance over a wide range of wind velocities and to improve starting torque at low wind velocities.

Where applicable, when central buffer panel 37 extends to form an "overhang" 37A over part of the flow-through channels 47 of the stator assembly 40, upper panel members 31 of the collector assembly 30 terminate relatively closer to the outer perimeter of the collector assembly 30, narrowing the exit section 36. This redirects high velocity airflow with greater concentration near outer perimeter of the collector assembly 30, and impacts the stator vanes 43 near their distal ends. The force of air pressure is greatest near the outer perimeter as airflow exits the flow-through channels 47 of the stator assembly 40, thus producing a larger moment arm and greater torque over a smaller arc of rotation.

It is expected that performance of the turbine rotor can be optimized for individual locations by varying the configuration of the stator assembly, configuration and alignment of the stator vanes and modifying the magnitude of the gap 52 between the stator assembly 40 and the turbine rotor 50. Stator vanes 43 may be repositioned selectively at angles of 45 degrees or less relative to the radial and the gap 52 may be adjusted by altering the vertical position of axial bearing member 15 to deliver optimum performance in a given set of wind conditions. The number of stator vanes preferably exceeds the number of rotor blades 55 by at least one, and preferably comprises an odd number if the number of rotor blades 55 comprises an even number.

Figure 7:
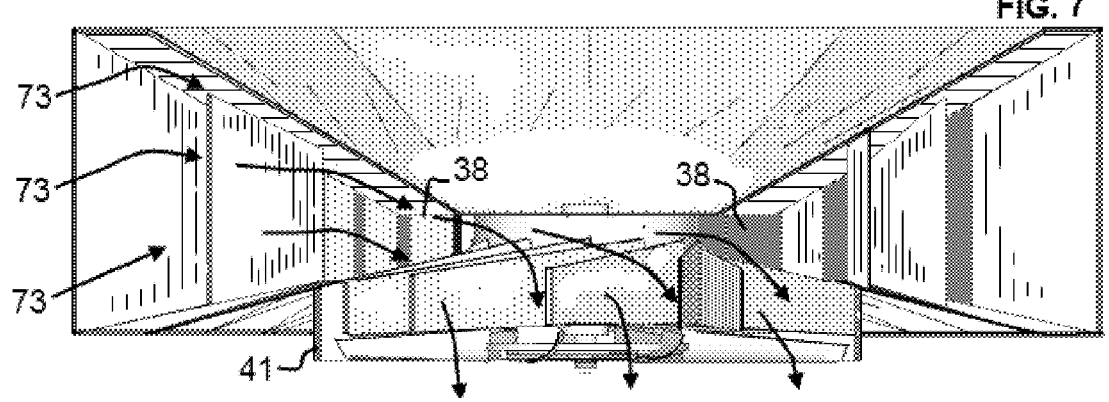
FIG. 7 is a cross-sectional side elevational view of the turbine assembly of FIG. 1 along lines B-B of FIG. 8. illustrating collector assembly configuration and airflow pattern.
Figure 8:
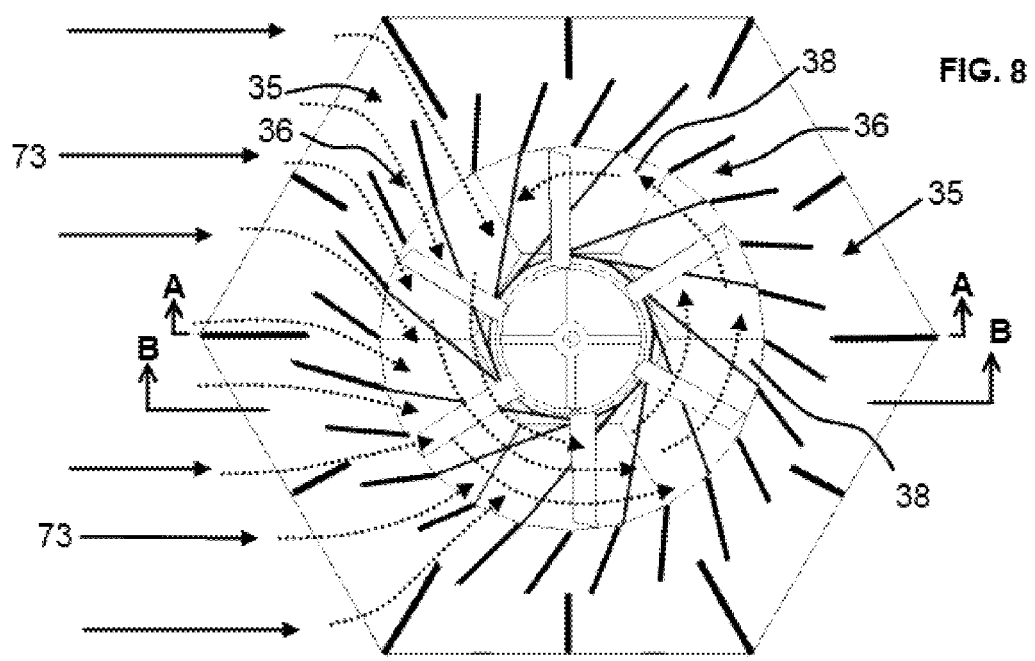
FIG. 8 is a plan schematic view of FIG. 1 or FIG. 14, omitting tower assembly, along lines C-C of FIG. 4, illustrating duct configuration and airflow pattern.

As illustrated in the plan schematic diagram of FIG. 8, rotor blade 55 is shown adapted to rotate in an anti-clockwise direction in response to downward airflow. As illustrated in FIG. 7, air enters the stator housing and is deflected downwardly by the stator walls in the form of boundary layers along the length of the stators. Part of this air stream flows through the swept area without directly impacting the rotor blades 55. This air stream component mixes with, and augments the flow of the total air mass flowing through the swept area. The remainder of this air stream flows over the rotating turbine blade 55.

Figure 11C:
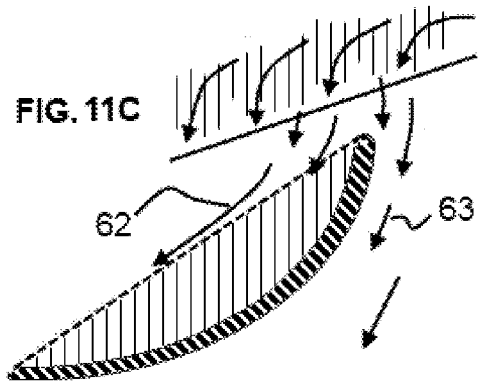
FIG. 11C is a cross-sectional schematic illustration of a turbine blade and stationary vane in accordance with this invention illustrating the airflow pattern along the line of intersection.
Figure 11D:
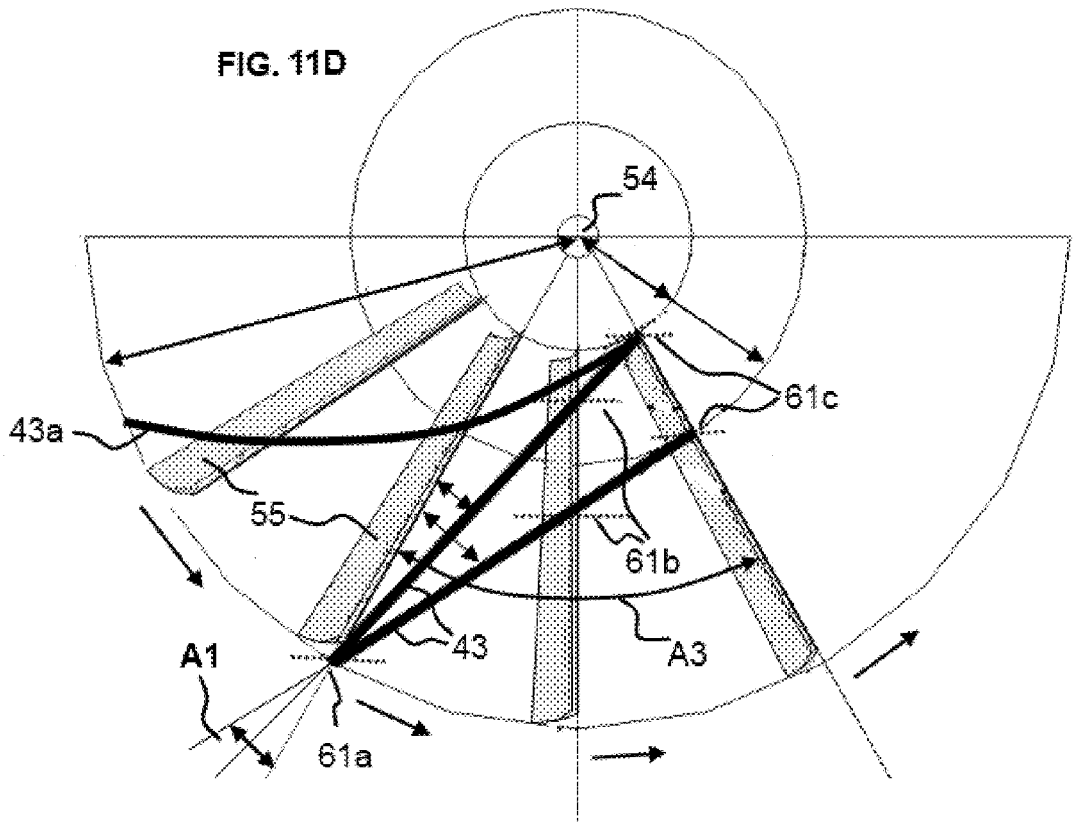
FIG. 11D is a top plan schematic illustration of a turbine blade and examples of stationary vanes in accordance with this invention illustrating operation in various configurations.
Figure 12:
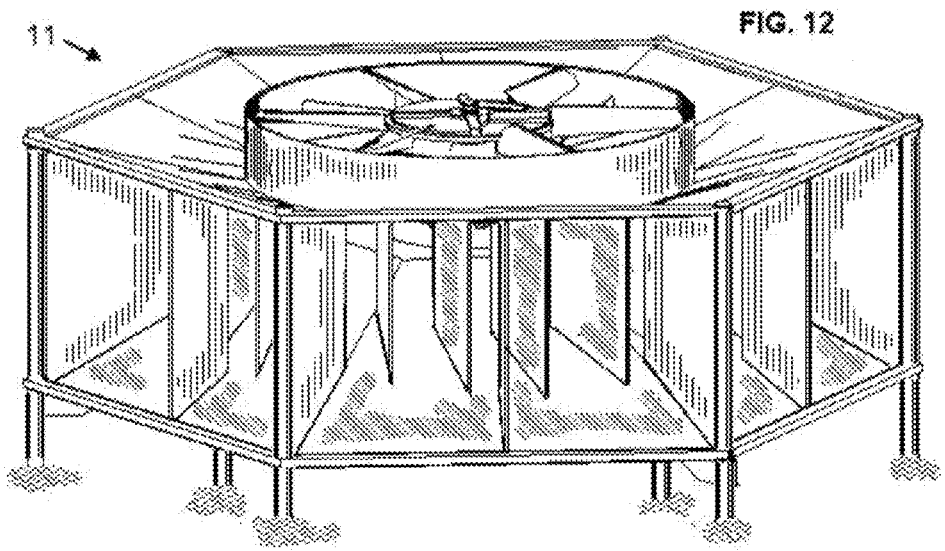
FIG. 12 is a view in perspective illustrating an alternate embodiment of the turbine assembly of FIG. 1, wherein the turbine rotor is inverted relative to the embodiment of FIG. 1.

As shown by arrows 62 and 63, in FIG. 11C, streams of air departing the trailing edge of stationary vane 43 flow over the leading edge of rotor blade 55 forcing the rotor to rotate. Downward airflow impacting the rotor blade 55 is distributed over the outwardly curved "lift" face of the blade and the opposing, inwardly curved, or "drag" face.

As illustrated in FIG. 11A, rotating turbine blade 55 crosses stationary vane 43 to form a moving intersection illustrated by a dotted vertical line 61. This downward airflow at and near the vertical line of intersection 61 of the rotating turbine blade 55 and stationary stator vane 43 creates a pressure drop on the outwardly curved "lift" face of the blade, and an elevation in pressure on the opposing, inwardly curved, or "drag" face, which combines to produce a force to create torque, driving the blade to rotate in the direction shown by the arrow 64. This force is greatest in the immediate area of the vertical line of intersection 61 and decreases with distance in either direction from the line of intersection 61. The line of intersection 61 is in continuous movement during blade rotation, and angular positioning of the vanes determines radial direction of movement and rate of change of movement of line of intersection 61 along the leading edge of the rotor blades, which affect the momentum of blade rotation and net torque. It will be apparent that a turbine blade will intersect more than one vane along different points of intersection, given that the number of vanes and their alignment have been appropriately predetermined.

In FIG. 11D, lines 61a, 61b, 61c denote positions of the leading edge of the blade 55 in progressive stages of rotation at points of intersection 61. Each successive stage moves the intersection 61 progressively closer to the axis of rotation 54. Thus, the second stage force vector advances inwardly from the blade tip to the hub as the blade rotates through the arc defined by the angle A3.

The initial momentum created when the tip of the blade enters the intersection 61 at the outermost end, contributes additively to the forces impacting the blade during the course of the blade's rotation through the arc of angle A3. As the moment arm or radius from the axis of rotation decreases, torque decreases proportionally. However, the blade's momentum contributes incrementally to the instant torque created in the course of travel within the arc.

It is apparent that the downward airflow at points along the lower edge of the stator vane adjacent to the line of intersection 61 will contribute to creating torque to some extent, depending on the airflow speed and proximity to the outwardly curved "lift" face of the blade or the opposing, inwardly curved, or "drag" face. Blade configuration and inclination can be modified in known ways to optimize the lift and drag elements over a wide range of wind conditions.

The intense downward airflow from the lower edge of the stator vanes also creates an entrainment effect causing surrounding air to be drawn downward through the swept area of the turbine blades, contributing to the overall rotation speed. As illustrated by line 43a in FIG. 11D, which shows a curved stator vane, it is apparent that the stator vanes need not be limited in shape and configuration to the straight line representations depicted in the drawings but may be formed with a curvature relative to the radial direction in order to distribute the forces impacting the blade during the course of the blade's rotation through the arc A3 in a predetermined manner. The curvature illustrated by line 43a allows a rotor blade to rotate through a relatively greater arc, thereby redistributing the forces impacting the blade over a greater time span while modifying the change in angle of intersection and change in moment arm in predetermined ways.

The invention claimed is:

1. A vertical axis wind turbine comprising
an axial flow turbine rotor mounted for rotation about a vertical axis, to supply force to operate an electrical generator, the turbine rotor having a plurality of rotor blades to define a swept area with an entry base and an opposing discharge base along a plane of rotation for passage of airflow vertically therethrough to impart torque to the rotor;
a shroud circumferentially disposed to envelop the turbine rotor so as to enclose the entry base of the swept area, thereby forming an annular circulation chamber coaxially with the turbine rotor, opening into the entry base of the swept area, the means shroud being formed to provide a plurality of air passages surrounding the circulation chamber with radially outwardly oriented entry openings for admitting ambient wind thereinto, and inwardly oriented exit openings to discharge captured airflow into the circulation chamber; the inwardly oriented exit openings aligned so as to discharge captured airflow into the circulation chamber at angles from the radial, so as to circulate the airflow within the circulation chamber;
a stator assembly mounted within the circulation chamber, a plurality of stationary vanes mounted therein to extend across the circulation chamber in close vertical to the entry base of the swept area at predetermined angles from the radial direction for intercepting and redirecting said circulating airflow generally vertically into the entry base of the swept area as high intensity laminar flow over the leading edges of rotor blades in order to extract maximum force from airflow to augment turbine rotor propulsion.

2. A vertical axis wind turbine as claimed in claim 1, wherein the stationary vanes extend across the airflow entry base within the circulation chamber parallel to the plane of the swept area at angles of between 10 and 65 degrees from the radial direction.

3. A vertical axis wind turbine as claimed in claim 1, wherein the stationary vanes are separated from the airflow entry base of the swept area by a minimal vertical spatial gap of predetermined magnitude in order to extract maximum force from airflow impacting the turbine rotor while avoiding contact between the components during operation.

4. A vertical axis wind turbine as claimed in claim 1, wherein the stationary vanes have a radially oriented curvature which extends across the airflow entry base from the perimeter of the swept area to the rotor hub.

5. A vertical axis wind turbine as claimed in claim 1, wherein the stationary vanes extend across the airflow entry base from the perimeter of the swept area at angles from the radial such that intersection of the stationary vanes and rotor blades progresses from the rotor blade tip to the rotor blade root.

6. In a vertical axis wind turbine comprising an axial flow turbine rotor mounted for rotation about a vertical axis;
a shroud surrounding the turbine rotor so as to envelop and enclose the entry base of the swept area to define a circulation chamber the shroud providing air passages for admitting ambient wind into the circulation chamber so as to circulate airflow therein;
a plurality of stationary vanes extended across the entry base of the swept area at predetermined angles from the radial direction to redirect said circulating airflow generally vertically into the swept area as high intensity laminar flow over the leading edges of rotor blades in order to extract maximum force from airflow to augment turbine rotor propulsion.

* * * * *